UNITED STATES PATENT OFFICE.

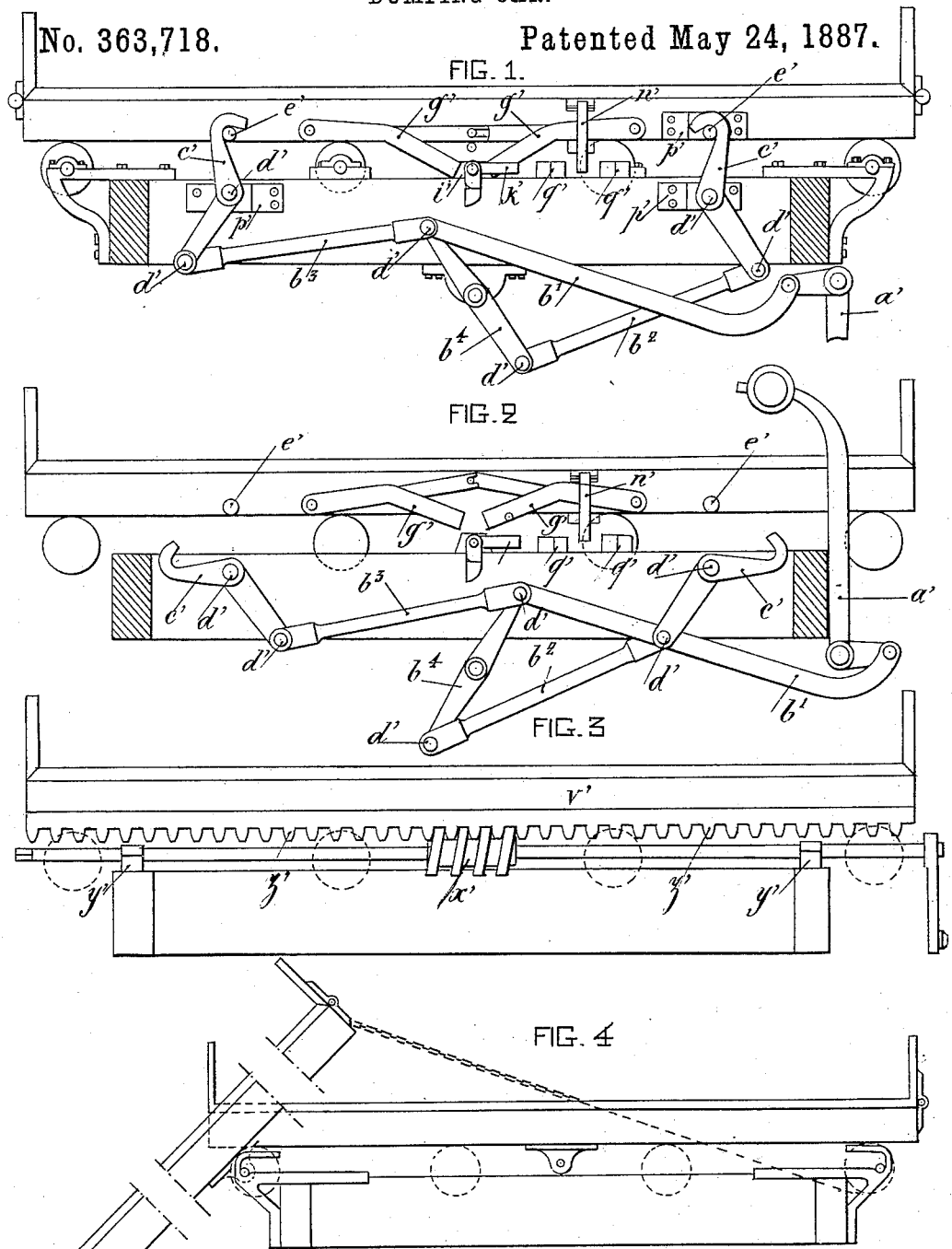

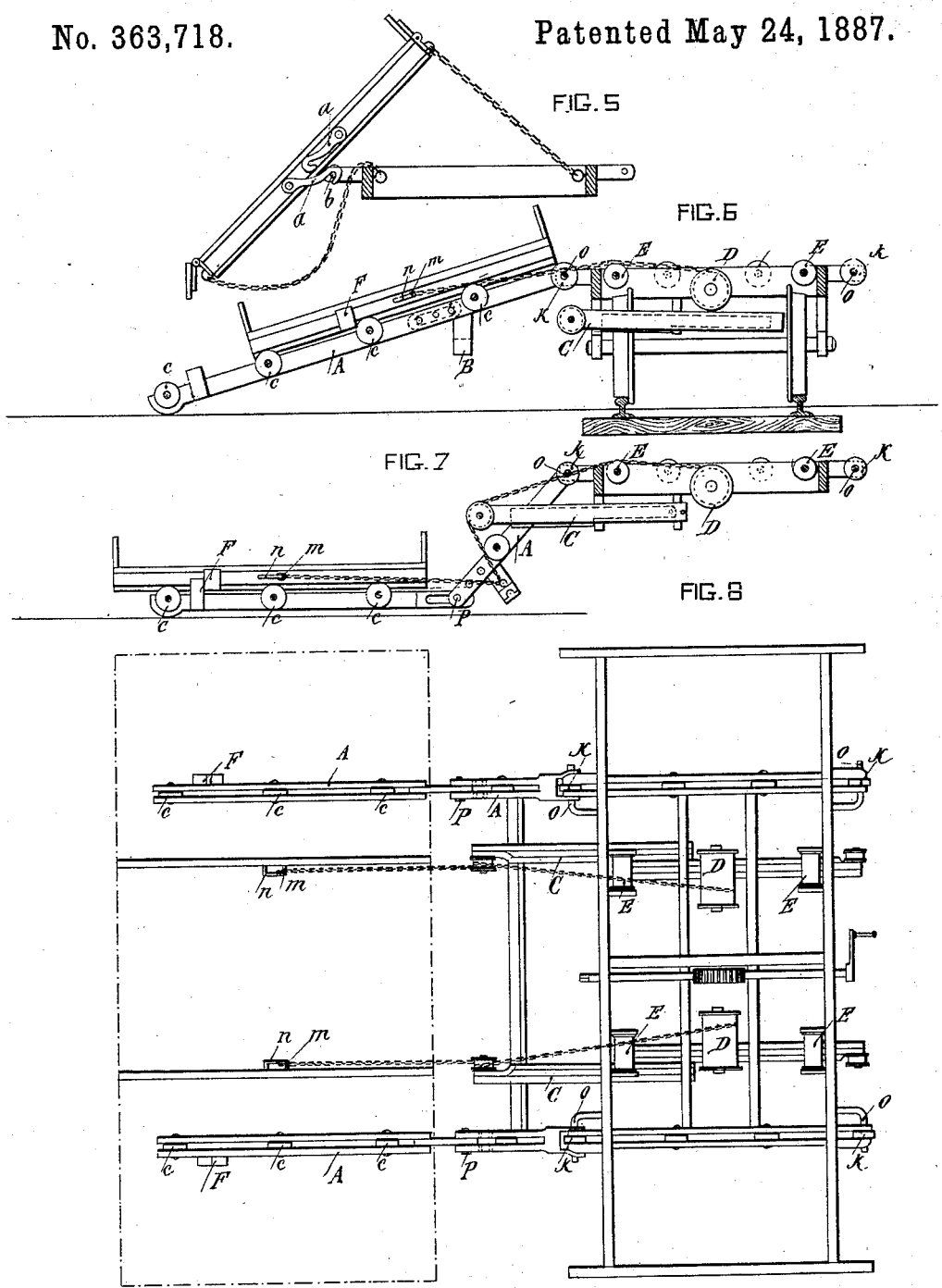

AUGUSTIN CHARLES MAURICE AUGUIN, OF RAINCY, NEAR PARIS, FRANCE.

DUMPING-CAR.

SPECIFICATION forming part of Letters Patent No. 363,718, dated May 24, 1887.

Application filed March 3, 1887. Serial No. 229,603. (No model.) Patented in Belgium October 4, 1886, No. 74,724.

*To all whom it may concern:*

Be it known that I, AUGUSTIN CHARLES MAURICE AUGUIN, of Raincy, near Paris, France, have invented new and useful improvements relating to railway-wagons and to means for facilitating the loading and unloading of the same, of which the following is a full, clear, and exact description.

This invention has for its object to enable the bodies or superstructures of railway-wagons to be displaced in either direction laterally of the line; and to this end it comprises the engaging apparatus hereinafter described.

A wagon provided with the improvements referred to is chiefly applicable for the transport of ballast, sand, earth, coke, stone, pyrite, minerals, and the like. It is, however, applicable for carrying other kinds of goods and materials, and also for the transport of artillery, horses, cattle, and munitions of war, the loading and unloading of which may be effected on the open line without having to improvise inclined planes or bridges.

My invention can be readily applied to existing railway-plants.

To enable my invention to be understood, I have represented it, by way of example only, in the accompanying drawings, in which—

Figure 1 shows the body of a wagon for goods, ballast, earth, minerals, and the like, the engaging apparatus being in position to lock the body. Fig. 2 is a view of the same, the disengaging apparatus being in its unlocked position. Fig. 3 shows the actuating mechanism for causing the inclination of the body. Fig. 4 shows the body tilted. Fig. 5 is a view illustrating the arrangement of hooks for retaining the movable body or superstructure of a wagon designed for the discharge of goods, ballast, earth, coal, minerals, sand, and the like. Fig. 6 shows the arrangement of the body of a truck designed for the transport of artillery material, and in an inclined position. Fig. 7 represents the body or superstructure resting completely upon the ground. Fig. 8 is a plan of this arrangement.

In the arrangement shown in Figs. 1 to 4 a single lever is sufficient to release the body of the wagon to permit it to be inclined. This is effected by means of a worm, $x'$, engaging with a rack, $z'$, and actuated by a crank, which is placed either directly upon the head of the worm-shaft or below the wagon by means of two bevel-pinions. In the latter case the crank is fixed. A shaft of the said worm extends to the middle of each side of the wagon, the rotation of which causes the displacement of the wagon as far as its tilting axis, either on one side or on the other. Under these conditions the superstructure, when moved to its tilting axis, projects about 1.10 meters beyond the line. There is consequently no danger of obstructing the line.

The superstructure of the wagon is provided at intervals with slides designed to bear upon fixed rollers attached to the truck or carriage of the wagon.

On each side and at each extremity of the superstructure is fixed one end of a chain, the other end of which is secured to the truck. These chains are designed to reduce the shock which the truck would otherwise have to sustain at the moment when the superstructure is inclined. They allow the proper inclination of the body for insuring the discharge of the load, which inclination can be reduced according to the nature of the material to be unloaded. The aforesaid rollers are mounted on the cross-beams of the truck by means of steel axles, which themselves turn in bearings.

The sides of the superstructure of the wagon are movable upon hinges and fixed by hooks or the like.

As already stated, a single motion is sufficient for the engagement and disengagement of the body.

The engaging and disengaging apparatus is actuated by levers, which are placed at the two ends of the wagon, but diagonally opposite to each other. Each of these levers is provided with a counter-weight designed to insure the safety of the engagement, as well as to indicate whether the mechanism is in the engaged or disengaged position. It is sufficient to lift or lower either of these levers to effect the engagement or disengagement of the apparatus. Each extremity of the wagon carries this apparatus, and a shaft actuates both sets of apparatus simultaneously by means of levers, hereinafter described. The engagement is indicated by the position of the lever $a'$ in Fig. 1, and the disengagement by the position in Fig. 2. In the latter case the lever $a'$ is lifted to the vertical position, as shown in Fig. 2.

In its movements it acts upon the connecting-rods $b'$ $b^2$ $b^3$ and the intermediate lever, $b^4$, connected at $d'$, and causes the hooks $c'$ to swing downward. The hooks $c'$ engage with pins or gudgeons $e'$, which are fixed at their two extremities to the cross-beams of the superstructure, as illustrated in Fig. 4. This part serves to insure the stability of the hooks $c'$, which rest upon the gudgeons $e'$.

The stability of the superstructure upon its truck in the lateral direction is secured partly by the abutment $i'$, with which engage the arms $g'$, actuated by the lever $a'$, which gives motion to a hinged catch, $k'$, and partly by the hooks $c'$. The superstructure is further supported in the lateral direction of the line by slides, in which the extreme ends of the cross-beams of the superstructure rest at four points.

The disengaging mechanism illustrated in Fig. 2 having disengaged the superstructure from the truck, the said superstructure, in order to leave its normal position and to incline, requires to be moved laterally by the worm shown in Fig. 3. This shaft carrying the worm $x'$ is fixed in bearings $y'$ on the truck, and the rack $z'$ is secured to the cross-beam $v'$ at the center of the superstructure and upon one of the sides of this cross-beam.

The worm, which to a certain extent increases the solidity of the truck, is designed either, when actuated from either one side or the other side of the wagon, to cause first the lateral displacement and afterward the inclination of the superstructure. At the moment when the superstructure arrives at its tilting axis it encounters at its extremities the hooks $l'$, fixed upon the truck, and at the same moment the superstructure presents the gudgeons $m'$, which take into the hooks $l'$. As above stated, the chains which are provided on each side of the wagon are designed to reduce the shock, which would otherwise act upon the hooks at the moment of the inclination.

The superstructure is brought back to its place by pulling with the hand upon one of the chains hereinbefore mentioned when the load has been discharged, the least force being sufficient to bring the superstructure back to its original position. At this instant the lever of the locking mechanism must be lowered.

The arms $g'$, which bear against the abutment $i'$, are designed to insure the certain return of the superstructure to the center of the truck, &c., that the locking-hooks $c'$ can engage properly. Without this abutment the worm could place the superstructure at one side or the other of the center of the truck and prevent the engagement.

The connecting-rod $b'$ carries at its upper end a tappet operated by the lever $a'$, which tappet encounters in its course the hinged lever $k'$, which lifts the arms $g'$. When this takes place, the hook $n'$ engages with the arms $g'$ and keeps them suspended and out of engagement with the abutment $i'$, as represented in Fig. 2. The superstructure is then absolutely free. Shortly after the displacement of the superstructure the hook $n'$ encounters two triangular abutments, $q'$, which, displacing the hook $n'$, allow the arms $g'$ to fall back into their original position, Fig. 1. On the return of the superstructure after the inclination these parts $g'$, by reason of their shape, are lifted by the abutment $i'$, and fall of themselves back to their position at the precise moment when the superstructure returns to its central position. Then, by lowering the lever $a'$, the superstructure is fixed to its truck by means of the apparatus above described. Each of the latter parts described performs its various motions by reason of its gravity.

The hooks $l'$, instead of being fixed to the frame of the wagon, as shown in Fig. 4, with the superstructure, can move and hold to the truck itself, as shown in Fig. 5. In their motion in the two directions they encounter at the extremities of their lateral movements gudgeons $b$, fixed to the frame of the truck, and with which they engage prior to the inclination.

The arrangement of the wagon for the transport of artillery, horses, cattle, and munitions of war is also capable of moving in a lateral direction relatively to the line, and the superstructure of the wagon is provided with engaging and disengaging apparatus. In this case, however, the superstructure must pass completely to the ground and preserve its horizontal position during the time necessary to load or unload it. For this purpose each side of the wagon is provided with jointed frames, upon which the superstructure is designed to run in descending to the ground and in being raised again onto the truck. These jointed frames are arranged as follows—that is to say, they are articulated to the wagon-frame by the axles of rollers $k$, which axles are in the form of bent pins O and insure the stability of the frames. These frames are normally carried one upon the other below the superstructure upon the wagon-truck, or one on each side of the wagon, their weight rendering the movement easy. They are maintained in this position by two supports having movable stops and counter-weights, and are composed of plates having rollers $c$ between them, upon which the superstructure runs as far as the stops F. These frames or arms are jointed, as represented in Fig. 7.

Chains or cables (represented in the drawings) are provided to enable, by means of windlasses, hereinafter described, the bending of the said frames upon their joints to conduct the superstructure to the ground and cause the jointed frames to assume their original inclination again, as shown in Fig. 6, and to draw the superstructure back onto the truck. The said chains are attached at $m$ to staples $n$, or the like, in the middle of the superstructure. The jointed frames are connected by a cross-piece, B, forming a tie and serving to support the jointed frames, Fig. 7, as well as to raise the latter. Movable supports C, each provided with rollers and stops and placed under the wagon-frame and between the wheels, assist, in connection with the cross-piece B, in lowering or raising the jointed frames, as represented in Fig. 7. The stops are movable and insure the replacement and securing of the supports C below the wagon, Fig. 6.

The windlasses D are placed at the center of the wagon, in order to permit the superstructure to be moved to the ground on either side of the line, as well as to regulate at will the inclination and replacement of the superstructure upon its frame, which without them would take place suddenly. The said windlasses are provided with toothed wheels and worms. The chains or cords pass over auxiliary cylinders E to insure their being wound around the windlasses D.

By locating jointed frames below the superstructure of the wagon, they do not interfere with the motion of the same, nor with the inclination of the superstructure for discharging earth, coal, minerals, or the like.

When the superstructure of the wagon is to be lowered to the ground, the said superstructure is conveyed by the worm represented as far as its tilting axis, the movable hooks being rendered immovable by a key. Then, by the aid of the windlasses D, the tipping of the superstructure is effected. The superstructure is then conveyed to the extremity of the jointed frames, the keys P are removed, and by means of the windlasses the jointed bars are allowed to bend and place themselves horizontally with the superstructure upon them, as shown in Fig. 7. To raise the superstructure again, the windlasses bring the jointed frames back to the angle at which they were placed for the descent, after which traction is brought to bear directly upon the superstructure, which is moved back to its place upon the frame.

I claim—

1. The combination, with the truck having the transverse shaft provided with a worm and the laterally-movable body having a transverse rack on its under side engaging the worm, of hooks and gudgeons for limiting the outward movement and forming the axis on which the body turns in dumping, substantially as set forth.

2. The combination, with the truck having rollers and hooks at its opposite sides, of the body movable laterally on said rollers and having gudgeons at the center of its lower side to enter the said hooks and form the axis on which the body may be turned, substantially as set forth.

3. The combination, with the truck and its laterally-movable body, having gudgeons $e'$, of the centrally-pivoted lever $b^4$, pivoted hooks $c'$, connecting-rods $b^2$ $b^3$, the lever $a'$, and the rod $b'$, connecting it with one end of lever $b^4$, whereby, by operating the lever $a'$, the hooks $c'$ may be thrown in and out of engagement with the gudgeons $e'$, substantially as set forth.

4. The combination, with the truck having the pivoted hooks, operating-levers therefor, an abutment, $i'$, between the hooks, and the hinged catch $k'$, extending in the path of the hook-operating mechanism, of the laterally-sliding body having gudgeons for the hooks, pivoted downwardly-curved connected arms engaging opposite sides of said abutment above the hinged catch $k'$, whereby, when the catch $k'$ is struck by the hook-operating mechanism, it will raise the arms out of engagement with the abutment, substantially as set forth.

5. The combination, with the truck having the pivoted hooks $c'$, the central lever, $b^4$, and its connections for operating the hooks, the abutment $i'$, the angle-catch $k'$, pivoted thereat and extending in the path of a tappet or lever, $b^4$, and the two stops at one side of the catch, of the laterally-movable body having the downwardly-curved connected arms $g'$, engaging the abutment at opposite sides, one of the arms being engaged on its under side by the catch, the gudgeons $e'$ for the hooks, and the arm-supporting hook $n'$, swinging at right angles to the arms $g'$ and entering the space between two stops, substantially as set forth.

6. The combination, with the truck having the jointed frames A, hinged to one side, and with the windlass D, of the laterally-sliding body and the chain connected therewith and to the windlass, substantially as set forth.

7. The combination, with the truck having the central longitudinal windlass, rollers E K, pivots O, and the transversely-sliding supports C, provided with rollers on their outer ends, of the frame A, hinged to the truck on the pivots O and jointed at P, to form an incline for the descent of the body, the stops on the outer ends of frame A, the body having stops F, adapted to engage the said stops on the frame A, and the chain passing from the windlass over pulleys E, around the pulleys on supports C, to the body, substantially as set forth.

The foregoing specification of my improvements relating to railway-wagons and to means for facilitating the loading and unloading of the same signed by me this 3d day of February, 1887.

AUGUSTIN CHARLES MAURICE AUGUIN.

Witnesses:
 ROBT. M. HOOPER,
 ALBERT MOREAU.